United States Patent [19]

Powers

[11] Patent Number: 5,425,280
[45] Date of Patent: Jun. 20, 1995

[54] SPAN GAP SLED RUNNER AND METHOD

[75] Inventor: Michael J. Powers, Crown Point, Ind.

[73] Assignee: USX Corporation, Pittsburgh, Pa.

[21] Appl. No.: 286,679

[22] Filed: Aug. 5, 1994

[51] Int. Cl.[6] ........................................... G01D 21/00
[52] U.S. Cl. ..................................... 73/865.9; 33/657
[58] Field of Search ............... 33/613, 632, 645, 655, 33/657; 73/865.9

[56] References Cited

U.S. PATENT DOCUMENTS

| Re. 30,075 | 8/1979 | Gonos et al. | |
|---|---|---|---|
| 537,017 | 4/1895 | Cameron | 33/657 |
| 1,687,192 | 10/1928 | Barber | 33/657 |
| 4,176,462 | 12/1979 | Holter et al. | |
| 4,290,289 | 9/1981 | Capriotti | |
| 4,294,305 | 10/1981 | Oda | 33/657 |
| 4,344,232 | 8/1982 | Kihlstrom | 33/657 |
| 4,354,315 | 10/1982 | Hecht | |
| 4,363,172 | 12/1982 | Ives | |
| 4,428,126 | 1/1984 | Banks | 33/645 |
| 4,548,070 | 10/1985 | Panetti | |
| 4,903,750 | 2/1990 | Ives | 33/657 |

FOREIGN PATENT DOCUMENTS

| 823134 | 11/1951 | Germany | 33/657 |
|---|---|---|---|
| 52907 | 4/1980 | Japan | 33/657 |

Primary Examiner—Hezron E. Williams
Assistant Examiner—Daniel S. Larkin
Attorney, Agent, or Firm—Armstrong, Westerman, Hattori, McLeland & Naughton

[57] ABSTRACT

A span gap runner for detecting and measuring misalignment of rolls in a continuous caster comprises an elongated member having a middle portion recessed from the bottom surface of the member, a position transducer mounted in an aperture of the member and at the midpoint of the member. The member has end portions adapted to span the distance between a three roll segment from a minimum roll spacing to a maximum roll spacing. Span gap is measured between the surface of the middle roll of the three roll segment and a line or plane tangent to the surfaces of the adjacent two rolls.

9 Claims, 5 Drawing Sheets

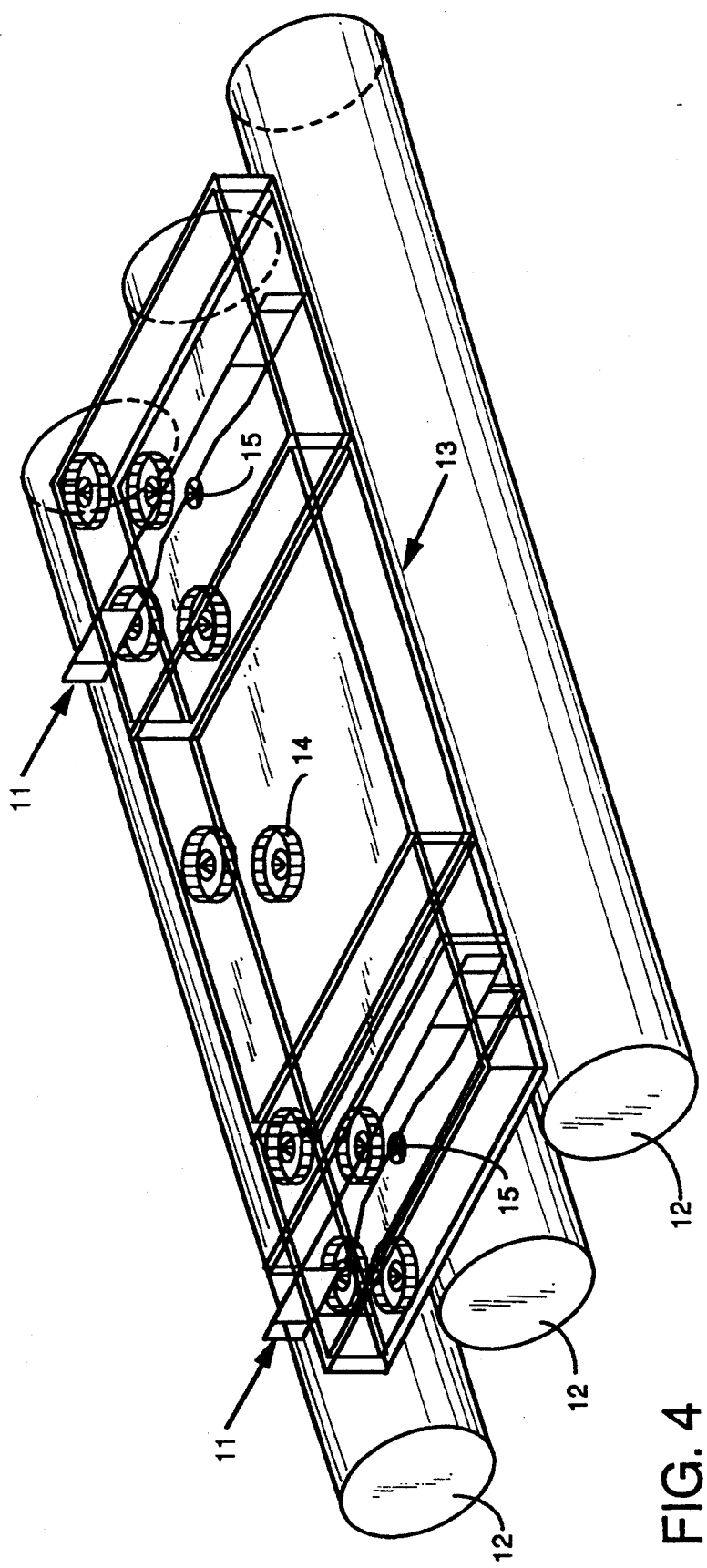

SPAN GAP SLED RUNNER AND METHOD

BACKGROUND OF THE INVENTION

1. Field of the Invention

This invention relates to a runner for mounting on a roll gap sled for measuring the misalignment of rolls in a machine for continuously casting a metal slab.

2. Prior Art

It is known to provide a sled-type apparatus for passing through the opposed rolls of a continuous caster in order to measure the gap between each pair of opposed rolls. Such a sled is fitted with transducers which measure the magnitude of the gap between opposed pairs of caster segment rolls. The length of the sled is less than the spacing of three rolls in the casting direction. This measurement value is assigned to the pair of rolls for which the measurement is made and is called the "roll gap" or simply the "gap" between the rolls so measured.

Roll gap has a direct effect on product quality and an incorrect roll gap contributes to slab casting defects such as core cracking. By measuring roll gap, it is possible to detect failed bearings and other problems in a caster segment by thus detecting a roll gap value which is larger than that called for in the caster design.

Traditional roll gap sleds cannot detect and measure roll segment alignment, i.e. a segment-by-segment transition of the slab passline. It also is necessary that the segment-to-segment transition, or alignment, be held within specified tolerances to allow for the production of a high quality, defect-free slab.

SUMMARY OF THE INVENTION

Therefore it is an object of the present invention to provide a novel gap sled runner which is capable of detecting and measuring misalignments in the rolls of a continuous caster.

This objective is fulfilled by the provision of a "span gap" runner, which, by spanning a segment of three rolls, can measure possible misalignment of the middle or spanned roll. For such purpose, the span gap runner has a middle portion recessed, and a position transducer mounted in the center of the recessed portion, whereby a span gap measurement is made between the surface of the spanned roll and a line or plane tangent to the surface of the two adjacent rolls.

BRIEF DESCRIPTION OF THE DRAWINGS

FIG. 4 is an isometric view of a gap sled with two span gap runners in place on the sled.

DESCRIPTION OF PREFERRED EMBODIMENTS

Figure 1:
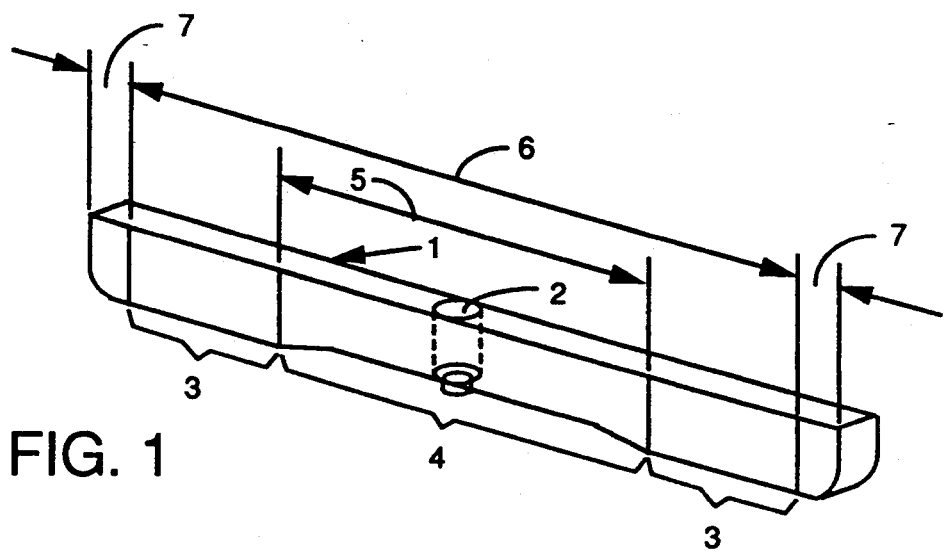
FIG. 1 is an isometric view of a span gap runner in accordance with the invention.

In FIG. 1 there is shown a span gap runner 1 having a position transducer 2 mounted in an aperture in the center of the runner. Runner 1 has a middle portion 4, of length 5 (representing a minimum roll spacing of rolls 8—FIG. 2), recessed from a bottom surface of the runner, e.g. about 0.100 inch. Recession of the middle portion of runner 1 leaves end portions 3 extending outwardly of the middle portion and spanning a distance 6 representing a maximum roll spacing of rolls 9, as shown in FIG. 3. The runner 1 terminates in extremites extending outwardly of end portions 3 for a distance 7 and having a rounded lower corner.

As shown in FIG. 4, a pair of span gap runners 11, with transducers 15, may be mounted on a conventional roll gap sled 13, having roll gap transducers 14, adjacent a set of three rolls 12. The two longer span gap runners are designed to completely span three rolls instead of only two as in the case of the conventional roll gap sled. The position transducers which are mounted in the middle of the span gap runners are positioned to measure the distance from the surface of the spanned, middle roll and a line or plane tangent to the surface of the two adjacent, upstream and downstream, rolls. In a single pass of the sled through the rolls, measurements of both roll gap, using the conventional roll gap transducers, and span gap, using the span gap runners, can be made.

Figure 2:
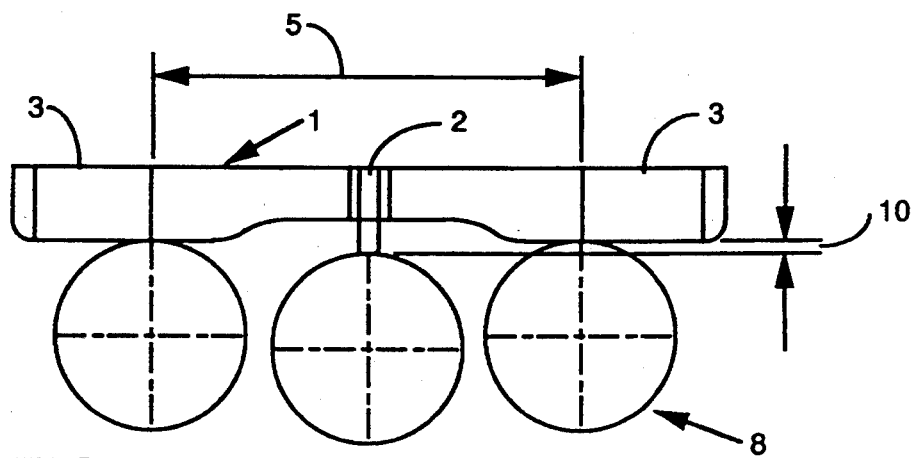
FIG. 2 is a side elevation of the span gap runner in measurement position adjacent a three roll segment of minimum roll spacing.
Figure 3:
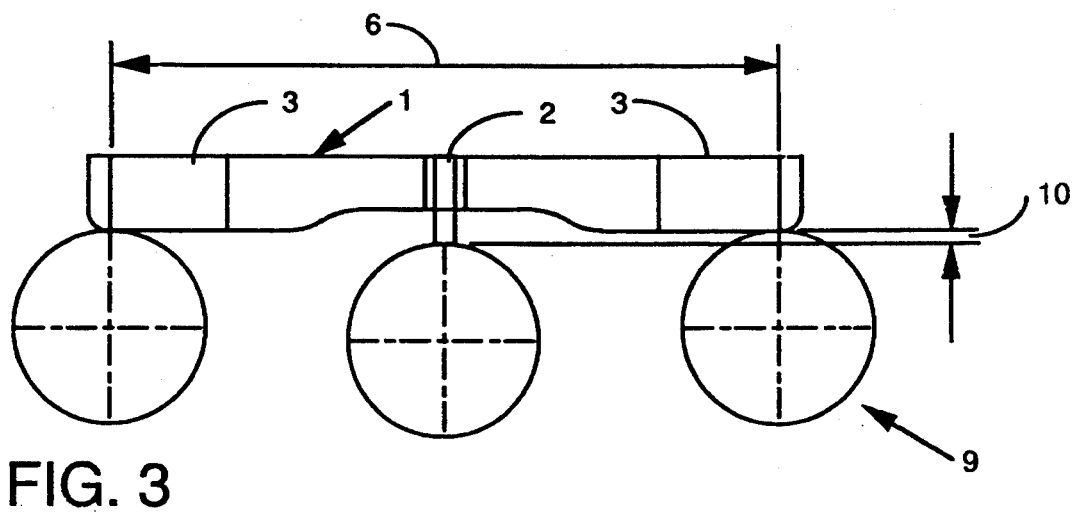
FIG. 3 is a similar side elevation showing the span gap runner in measurement position adjacent a three roll segment of maximum roll spacing.
Figure 5A:
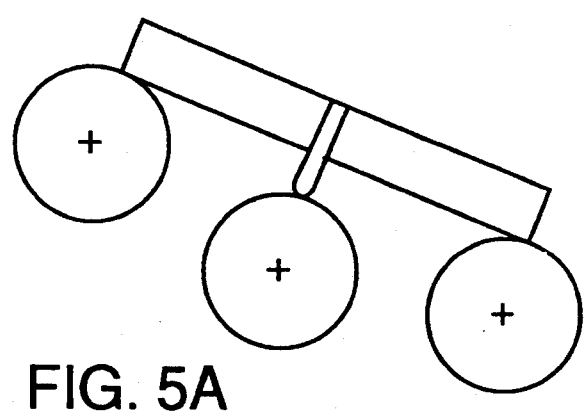
FIG. 5A is a side elevation of a flat bottomed span gap runner in measurement position in a curved segment of a caster.
Figure 5B:
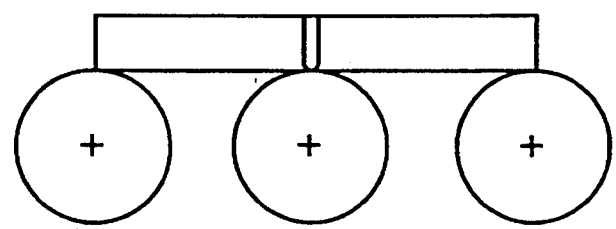
FIG. 5B is a side elevation of a flat bottomed span gap runner in measurement position in a straight segment of a caster and where there is no misalignment of the measured rolls.
Figure 5C:
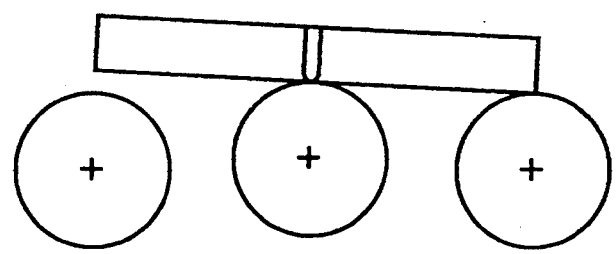
FIG. 5C is a side elevation of a flat bottomed span gap runner in measurement position in a straight segment of a caster and where there is a negative span gap (spanned roll higher than the two adjacent rolls).
Figure 5D:
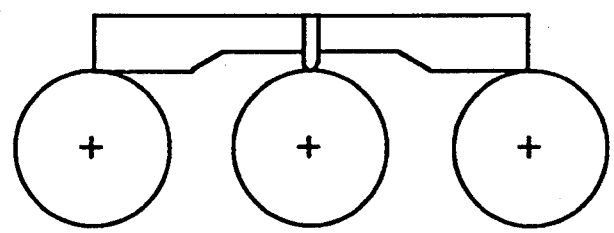
FIG. 5D is a side elevation of the span gap runner of the invention in measurement position in a straight segment of a caster and where there is a negative span gap.

As shown in FIGS. 2 and 3, a positive span gap, represented by the numeral 10, exists when the spanned roll is lower than the two adjacent rolls. The span gap runner is designed to work with roll spacings varying from the minimum roll spacing (FIG. 2) to the maximum roll spacing (FIG. 3) found in the casting machine. The portion 4 of the runner between the roll contact zones is recessed upwardly away from the roll surfaces so that the runner may function in the straight part of the caster. Thus, even a hypothetical flat bottomed runner would function as a span gap runner in the curved part of the caster, as shown in FIG. 5A since the curve of the roll path would result in displacement of the middle roll away from the bottom of the runner. Also a hypothetical flat bottomed runner would function as a span gap runner in the straight part of the caster, but only if the alignment of the spanned roll is zero or positive, that is, lower than the adjacent rolls, as shown in FIG. 5B. However, a hypothetical flat bottomed runner would not function as a span gap runner in the straight part of the caster if the span gap is negative, that is, higher than the two adjacent rolls. As shown in FIG. 5C, such a condition would result in a span gap measurement of zero; however, such a value is not correct, because a misalignment condition exists that has merely bottomed out the sensor and lifted one end of the runner off the adjacent roll. Such a condition is successfully addressed by the span gap runner of the invention, as shown in FIG. 5D.

The span gap runners can be designed to work on either the inner (higher) or the outer (lower) bow of rolls. The outer bow of rolls is preferable for making span gap measurements because they are more directly connected to the segment mount on the caster frame than the upper rolls.

In operation, a span gap runner makes a measurement of the span gap for each caster roll as the gap sled passes through the cast line. If the roll positions in a caster are numbered, e.g. 1, 2, 3, 4, 5, 6 etc., a span gap measurement across rolls 1-3 is assigned to roll 2; a span gap measurement across rolls 2-4 is assigned to roll 3, etc. Each span gap runner generates one distinct span gap value for each roll so measured.

The number of distinct span gap values generated for each caster roll is equal to the number of span gap runners employed in the gap sled. For the gap sled shown in FIG. 4, two distinct span gap values will be generated for each caster roll position. The runners function independently of one another, both mechanically and electronically. Multiple span gap values generated from the same roll position may or may not be combined to obtain a single result.

When the data are assembled after a run, the individual span gap values are reported by assigning to them their respective roll position numbers from which the measurement was made. The span gap runner has no ability to report its passage from one segment to another. It is known by operating personnel which roll numbers are located in which segment. It is then known from the roll numbering which span gap values are indicators of a segment to segment alignment, and which are indicators of a roll misalignment within the segment. This information is used, e.g. by a computer, to provide a recommendation for shimming the segment/machine frame connection to correct the misalignment.

Figure 6:
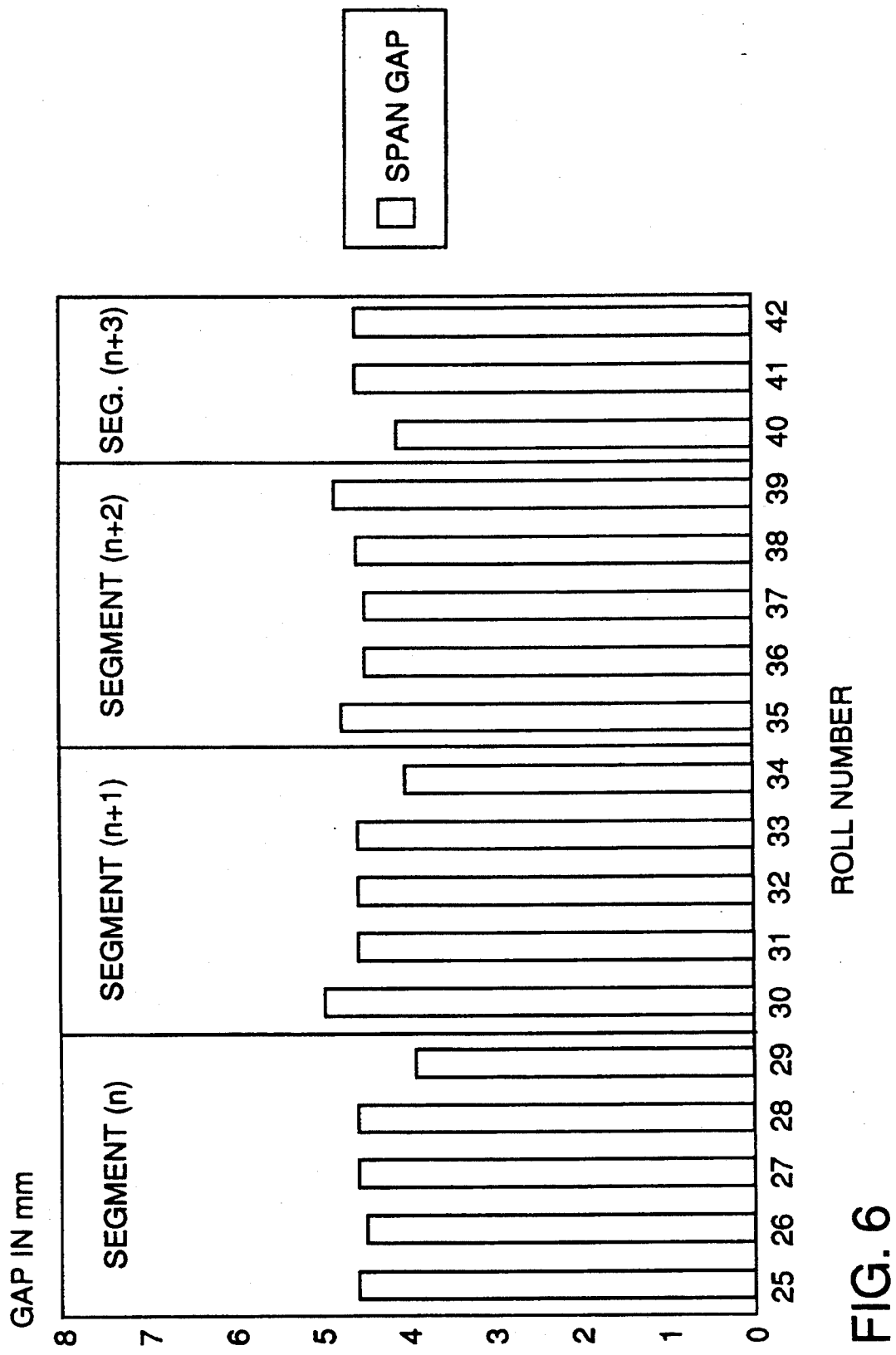
FIG. 6 is a bar graph relating roll number, by segment, in a continuous caster, and showing segment misalignments.
Figure 7:
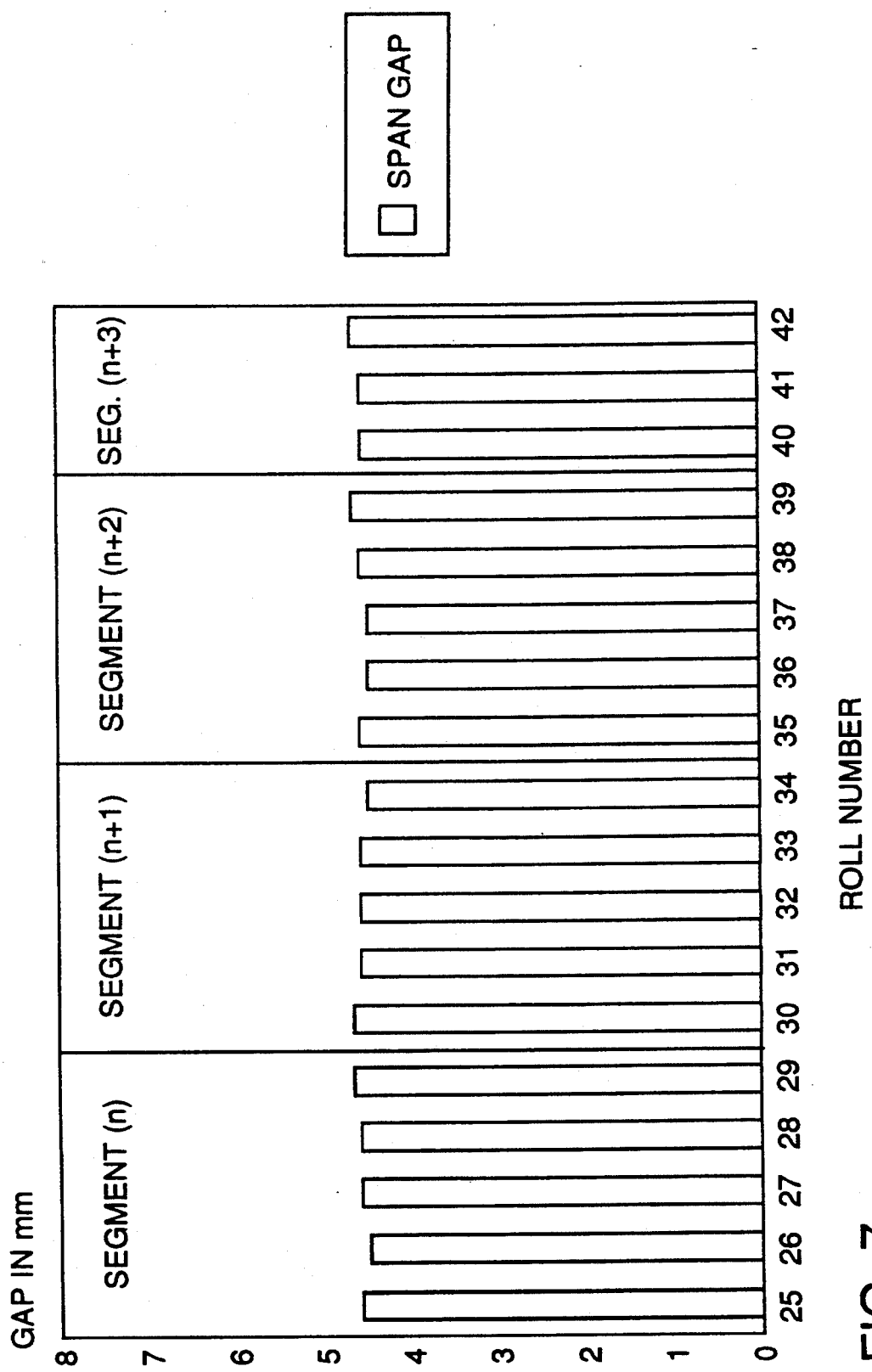
FIG. 7 is a similar bar graph showing substantially complete freedom from segment misalignment.

The effectiveness of application of the invention can be seen by a comparison of the data of FIGS. 6 and 7. In FIG. 6, before adoption of the invention, there are relatively large deviations in span gap transition from one segment to another. In contrast, in FIG. 7, with use of the invention, transition from one segment to another is essentially smooth.

What is claimed is:

1. A span gap runner comprising an elongated runner member having generally rectangular length and width cross sections, a middle portion of the member being recessed from a bottom surface of the member and having an aperture in the center of the member and extending from a top surface of the member to a mid point of a surface of the recessed portion, a position transducer mounted in the aperture, the member having end portions each extending from an end of the recessed portion to a point near an extremity of the runner member and of such length that the end portions of the runner member will span a middle roll of a three roll series from a minimum roll spacing to a maximum roll spacing.

2. Apparatus for detecting and measuring misalignment of rolls in a roll segment of a continuous caster, comprising at least one span gap runner mounted on a roll gap sled for spanning a segment of three rolls in the inner or outer bow of rolls and adapted to detect and measure misalignment of the middle roll of the three roll segment, whereby, in a pass of the sled through the rolls of the caster, span gap is measured.

3. Apparatus according to claim 2, wherein the roll gap sled has at least one roll gap transducer mounted on the sled for measuring the roll gap between an opposed pair of rolls disposed in inner and outer bows of rolls, whereby, in a single pass of the sled through the rolls of the caster, both roll gap and span gap is measured.

4. Apparatus according to claim 2, wherein there are a pair of span gap runners mounted on the sled and each span gap runner individually detects and measures span gap of the middle roll of each three roll segment.

5. Apparatus according to claim 4, wherein each span gap runner comprises an elongated member having a middle portion thereof recessed from a bottom surface thereof and end portions each extending from an end of the recessed middle portion to a point near an extremity of the member, and a position transducer mounted in an aperture of the member at a center point thereof and extending through the member and in communication with a surface of the recessed portion.

6. A method of detecting and measuring misalignment of rolls mounted in partly curved and partly straight portions of a roll path in a continuous caster, comprising spanning a three roll segment of rolls with a span gap runner, recessing a middle portion of the runner so that the runner will function in a straight portion of the roll path when a roll therein has a negative span gap, and measuring a span gap between a surface of a middle roll of the three roll segment and a line or plane tangent to surfaces of the adjacent upstream and downstream rolls of the three roll segment.

7. A method according to claim 6, wherein span gap measurement is made by use of a position transducer mounted in the center of the span gap runner.

8. A method according to claim 7, comprising mounting a pair of span gap runners on a conventional roll gap sled, and making individual span gap measurements with each span gap runner.

9. A method according to claim 8, comprising making both roll gap and span gap measurements in a single pass of the sled through the rolls.

* * * * *